METHOD OF CONSTRUCTING EVAPORATION MASKS

Filed Jan. 23, 1964

INVENTORS
WILLIAM LIBEN
ARNOLD ALEXANDER
GEORGE A. HILLMAN

BY Herman L. Gordon
ATTORNEY 3,342,706
Patented Sept. 19, 1967

3,342,706

METHOD OF CONSTRUCTING EVAPORATION MASKS

William Liben, 11404 Monticello Ave., Silver Spring, Md. 20902; Arnold Alexander, 122 4th Ave., Lansdowne, Md. 21227; and George A. Hillman, 125 Quackenbos St. NW., Washington, D.C. 20011

Filed Jan. 23, 1964, Ser. No. 339,632
6 Claims. (Cl. 204—11)

ABSTRACT OF THE DISCLOSURE

A method of forming a peripherally reinforced, substantially unitary evaporation mask or stencil consisting of photographing a resist pattern corresponding to the areas to be stencilled on a stainless steel matrix plate having an oxidized surface, bolting a nickel ring to the plate around the pattern, and covering all the surface of this assembly except that inside the ring with stop-off lacquer. The resultant assembly is suspended vertically in a nickel-plating bath, using a supporting cathode conductive clamp whose jaws grip the top portion of the steel plate and penetrate through the lacquer. A film of nickel is plated on the inside of the ring and across its area, covering the exposed surfaces except the resist pattern. The assembly is then taken out of the bath and the stop-off material is stripped off. The matrix plate is then unbolted from the ring and separated therefrom, leaving the desired unitary resultant evaporation mask or stencil, defined by the remaining ring and film.

This invention relates to evaporation masks and to methods of fabricating such masks.

In the fabrication of microelectronic circuits by evaporating thin films of metals or dielectrics evaporation masks are usually employed to delineate the areas to be covered by the thin films. These masks have been made of thin sheet metal provided with openings through which the deposited material passes. These masks have been made usually in either of two ways: (1) etching the openings in thin sheet metal, or (2) electroplating the mask metal and omitting the deposition at the required locations of the openings.

Masks made by these techniques have a number of undesirable features: (1) they are fragile and must be handled with great care; (2) they are frequently bowed so that as a result they scratch the substrate on which the deposit is to be formed, or do not contact it at all; (3) their temperature coefficient of expansion differs from that of the mask support, causing distortion at high temperatures; (4) when the mask is assembled on a supporting frame, a registration error usually results.

A prime purpose and object of the present invention is to provide a novel and improved evaporation mask which overcomes the above disadvantages and which does so by fabricating the evaporation mask as an integral part of the support frame therefor.

A further object of the invention is to provide a novel and improved method of fabricating a thin evaporation mask in integral relationship with its rigid support frame by the use of an electroplating process.

A still further object of the invention is to provide an improved evaporation mask assembly wherein the thin apertured mask element is integrally formed on a rigid supporting frame of the same metal as the mask element, thus reducing thermal expansion problems to a minimum.

Further objects and advantages of the invention will become apparent from the following description and claims, and from the accompanying drawings, wherein:

Figures 1, 2, 3, 4, 5, 6, 7, 8, 9, 10:
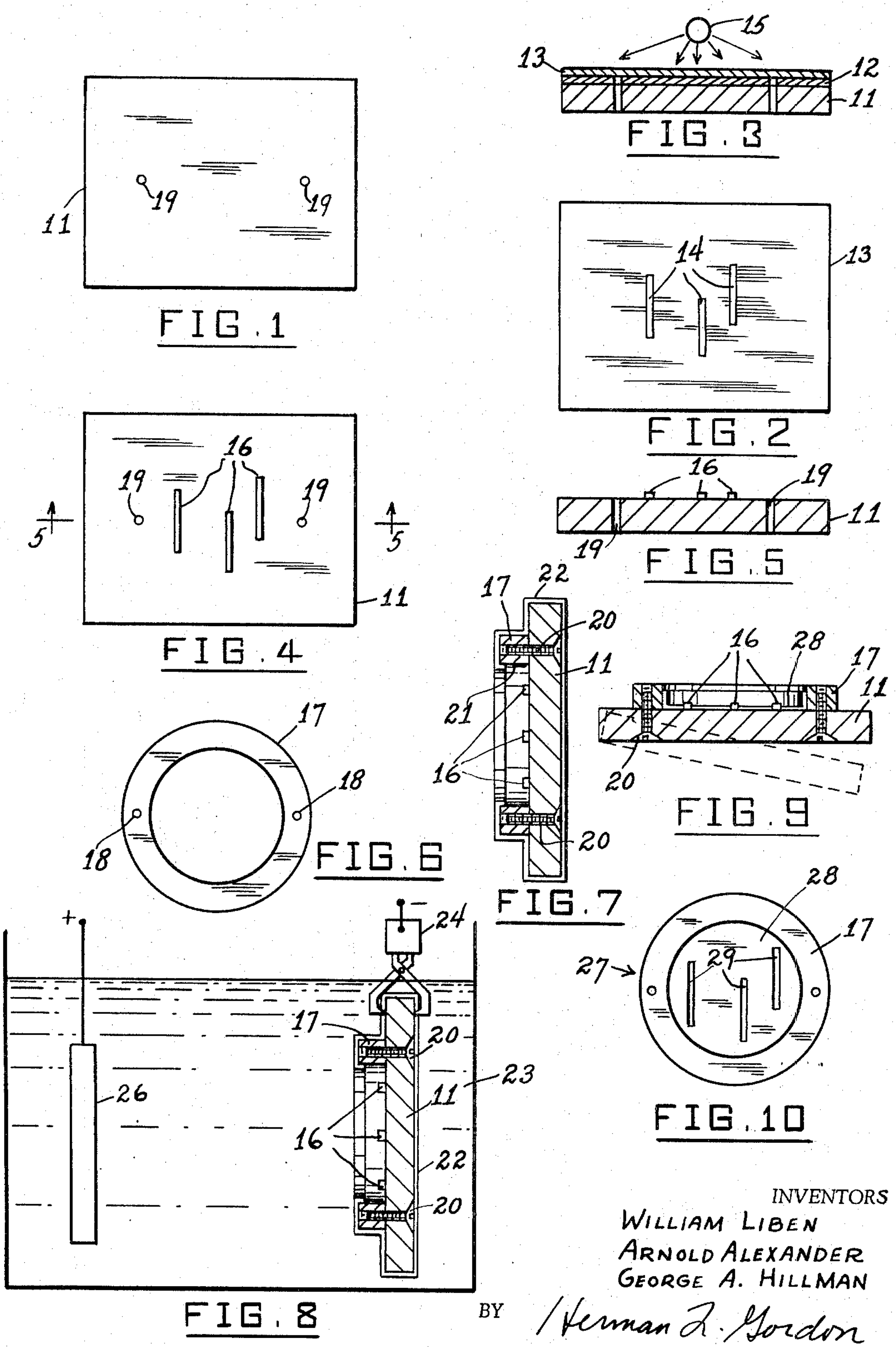
FIGURE 1 is a top plan view of a matrix member employed in forming an evaporation mask by the method of the present invention.
FIGURE 2 is a top plan view of a typical negative transparency containing transparent areas corresponding to desired metal deposition areas in the final evaporation mask.
FIGURE 3 is a diagram illustrating the photographic exposure of the coated matrix member of FIGURE 1.
FIGURE 4 is a top plan view showing the matrix member after developing its exposed resist surface.
FIGURE 5 is a vertical cross-sectional view taken on line 5—5 of FIGURE 4.
FIGURE 6 is a top plan view of a mask support frame employed in forming the evaporation mask according to the present invention.
FIGURE 7 is a vertical cross-sectional view taken through the assembled matrix member and support frame, prepared for electroplating.
FIGURE 8 is a diagram showing the assembly of FIGURE 7 supported in an electroplating bath.
FIGURE 9 is a vertical cross-sectional view taken through the assembly of FIGURE 7 after electroplating and with the stop-off lacquer removed.
FIGURE 10 is a plan view of the final evaporation mask, ready for use.

Referring to the drawings, 11 designates a matrix member, employed as a supporting base for fabricating the desired evaporation mask. The matrix member 11 comprises a plate of suitable metal, such as stainless steel, having a passivated surface, such as would be obtained by natural oxidation. As a first step in the process of forming the evaporation mask, the matrix member 11 is provided with a surface coating 12 of suitable resist material, which is commercially available, and is well known per se. This material is applied to the matrix member and distributed thereover in any suitable manner. For example, while the matrix member is spun or rotated on a suitable rotary support, a few drops of the photographic resist material are dropped on the matrix member, The spinning action spreads the photo-resist material uniformly over the surface of the matrix member, throwing off excess photo-resist material.

The next step in the process comprises placing a transparency 13 over the layer of photo-resist material 12, said transparency consisting of a photograph of the apertures to be formed in the desired mask, said apertures being represented as clear areas on the transparency, the rest of the area thereof being opaque. Thus, as shown in FIGURE 2, the transparency 13 has the transparent areas 14, corresponding to the apertures desired on the evaporation mask, the remainder of the member 13 being opaque.

The assembly is then exposed to suitable radiation, such as ultra violet radiation from a suitable ultra violet source 15, as shown in FIGURE 3. The transparency 13 is then removed and the exposed photo-sensitive face of the matrix member 11 is developed in a conventional manner, using suitable developer, which is usually available from the manufacturer of the photo-resist material.

The developing step dissolves away all the resist material except that which was exposed through the transparent areas 14. This remaining resist material is shown at 16 in FIGURE 5, and is a photographic replica of the clear spaces 14 on the original transparency 13.

In the next step, a rigid frame member 17 of the same metal as the intended mask is clamped to the matrix member 11 around the masses 16 of resist material. Thus, the frame member 17 may comprise a circular nickel ring of substantial thickness having diametrically located tapped holes 18, 18 registrable with clamping apertures 19, 19 provided in the matrix member. The ring 17 is clamped to the matrix member 11 by bolts 20, 20 engaged through the apertures 19, 19 and threadedly engaged in the tapped openings 18, 18, being tightly clamped to the matrix member by said bolts, and surrounding the resist masses 16.

All of the exposed surfaces except the major portion of the interior bore 21 and the surface of the matrix member surrounded thereby are then coated with a layer of suitable stop-off lacquer 22 (commercially available), as shown in FIGURE 7.

The assembly of FIGURE 7 is then suspended vertically in an electroplating bath 23, the matrix member 11 being in conductive electrical contact with the cathode clamp 24, which penetrates the layer of stop-off lacquer 22 at the top portion of the matrix member 11, as shown in FIGURE 8, the anode 26 comprising a bar of the metal to be deposited, namely, nickel. The plating is continued until a thin layer of nickel has been deposited on all of the exposed metal surface of the cathode assembly, comprising matrix member 11 and ring 17. After the desired thickness of nickel has been deposited, the cathode assembly is removed from the bath 23.

The stop-off lacquer layer 22 is then stripped off and the bolts 20 are then removed. The stainless steel matrix member is then disengaged from the ring 17 by prying it off. This leaves the desired evaporation mask assembly, shown at 27 in FIGURE 10, comprising the rigid supporting ring 17 with the thin nickel mask element 28 bonded thereto, said mask element containing the holes 29 defined by the resist masses 16 on the matrix member 11.

The matrix member separates easily from the evaporation mask assembly 27, since the surface of the matrix member is passivated, i.e., has a thin layer of oxide, to which the plating does not adhere.

The mask assembly 27 can be easily handled, due to the rigidity and strength of the ring 17, which acts as a support for the plated mask element 28. The thickness of the mask element can be accurately controlled by controlling the plating current and the duration of the plating action.

While a specific embodiment of an improved evaporation mask assembly and a method of fabricating same have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A method of fabricating a peripherally reinforced, substantially unitary evaporation mask comprising depositing a resist pattern on a matrix plate, said matrix plate having a passivated surface to which plating is non-adherent, and said resist pattern comprising resist material deposited on said surface, detachably bolting a rigid metal frame ring to said matrix plate surrounding said resist pattern and in contact with said surface, electroplating a film of the same metal as said ring adherently onto the inside of the ring and across the central aperture of the ring, whereby to cover the surface inside the ring except for said resist material, and then unbolting and removing the matrix plate.

2. A method of fabricating a peripherally reinforced, substantially unitary evaporation mask comprising photographing a resist pattern on a matrix plate, said matrix plate having a passivated surface to which plating is non-adherent, and said resist pattern comprising resist material deposited on said surface, bolting a rigid metal frame ring to said matrix plate surrounding said resist pattern and in contact wtih said surface, electroplating a film of the same metal as said ring adherently onto the inside of the ring and across the central aperture of the ring, whereby to cover the surface inside the ring except for said resist material, and then unbolting and removing the matrix plate.

3. A method of fabricating a peripherally reinforced, substantially unitary evaporation mask comprising depositing a resist pattern on a matrix plate, said matrix plate having a passivated surface to which plating is non-adherent, and said resist pattern comprising resist material deposited on said surface, detachably bolting a rigid metal frame ring to said matrix plate surrounding said resist pattern and in contact with said surface, covering substantially all surfaces of the resultant assembly, except the surfaces inside said ring, with stop-off material to which plating is non-adherent, electroplating a film of the same metal as said ring adherently onto the inside of the ring and across the central aperture of the ring, whereby to cover the surface inside the ring except for said resist material, stripping off the stop-off material, and then unbolting and removing the matrix plate.

4. A method of fabricating a peripherally reinforced, substantially unitary evaporation mask comprising photographing a resist pattern on a matrix plate, said matrix plate having a passivated surface to which plating is non-adherent and said resist pattern comprising resist material deposited on said surface, bolting a rigid metal frame ring to said matrix plate surrounding said resist pattern and in contact with said surface, covering substantially all surfaces of the resultant assembly, except the surfaces inside said ring, with stop-off material to which plating is non-adherent, electroplating a film of the same metal as said ring adherently onto the inside of the ring and across the central aperture of the ring, whereby to cover the surface inside the ring except for said resist material, stripping off the stop-off material, and then unbolting and removing the matrix plate.

5. A method of fabricating a peripherally reinforced, substantially unitary evaporation mask comprising photographing a resist pattern on a stainless steel matrix plate, said matrix plate having a passivated surface to which plating is non-adherent and said resist pattern comprising resist material deposited on said surface, bolting a rigid nickel frame ring to said matrix plate surrounding said resist pattern and in contact with said surface, electroplating a film of nickel adherently onto the inside of the ring and across the central aperture of the ring, whereby to cover the surface inside the ring except for said resist material, and then unbolting and removing the matrix plate.

6. A method of fabricating a peripherally reinforced, substantially unitary evaporation mask comprising photographing a resist pattern on a stainless steel matrix plate, said matrix plate having a passivated surface to which plating is non-adherent and said resist pattern comprising resist material deposited on said surface, bolting a rigid nickel frame ring to said matrix plate surrounding said resist pattern and in contact with said surface, covering substantially all surfaces of the resultant assembly, except the surfaces inside said ring, with stop-off lacquer material to which plating is non-adherent, suspending the assembly substantially vertically in an electroplating bath with the matrix plate in conductive contact at its top portion with a supporting cathode clamp gripping said top portion and penetrating the stop-off lacquer material, electroplating a film of nickel adherently onto the inside of the ring and across the central aperture of the ring, whereby to cover the surface inside the ring except for said resist material, stripping off the stop-off material, and then unbolting and removing the matrix plate.

References Cited

UNITED STATES PATENTS

| | | | |
|---|---|---|---|
| 2,171,276 | 8/1939 | Norris | 204—11 |
| 2,246,380 | 6/1941 | Norris | 204—11 |
| 2,459,129 | 1/1949 | Gresham et al. | 204—11 |
| 3,314,866 | 4/1967 | Liben | 204—3 |

JOHN H. MACK, *Primary Examiner.*

T. TUFARIELLO, *Assistant Examiner.*